Aug. 30, 1966   N. W. FOWLER   3,269,270
GEAR MACHINE OR THE LIKE
Filed May 4, 1964   2 Sheets-Sheet 1
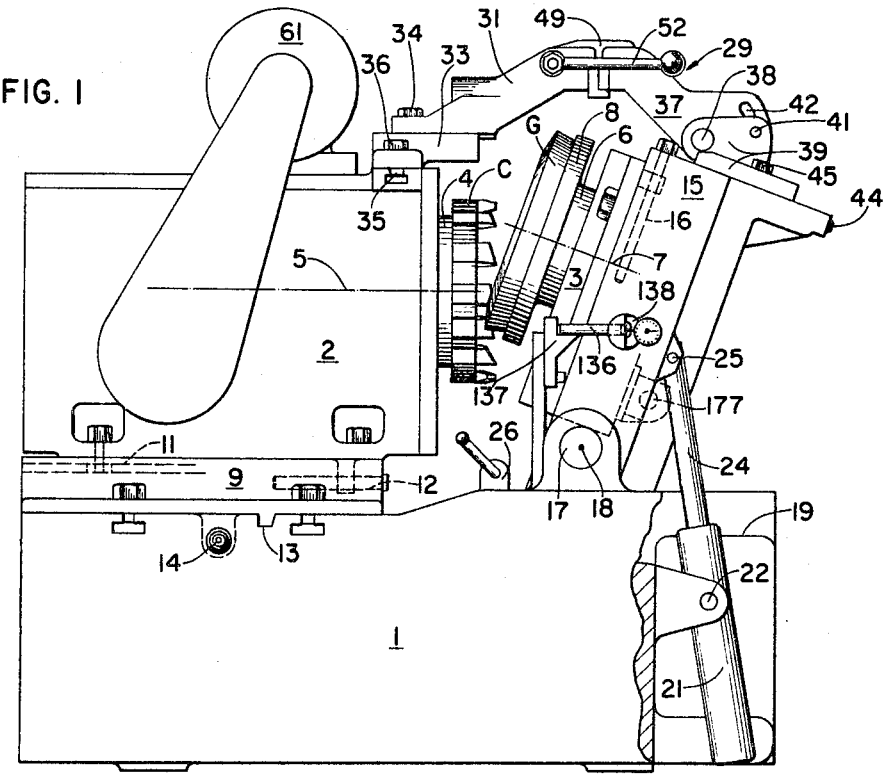
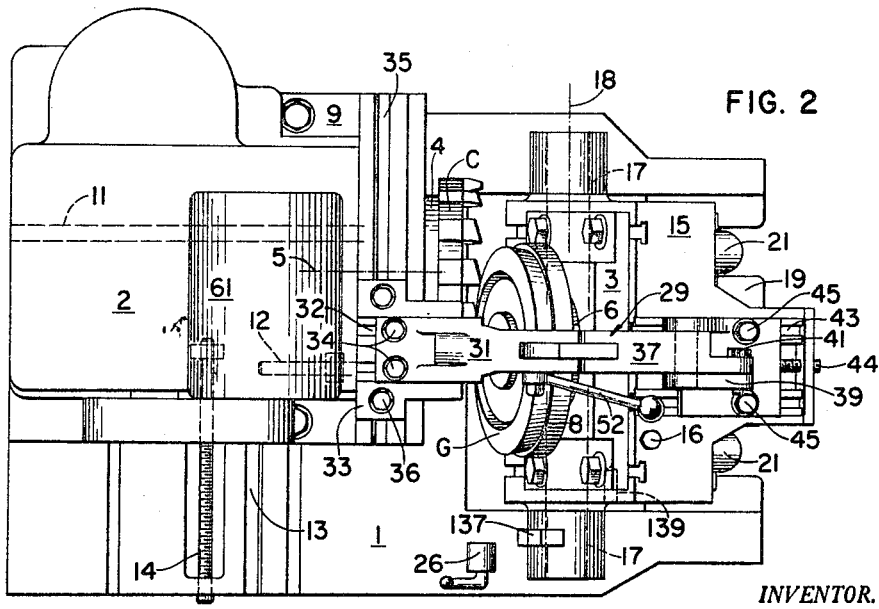
INVENTOR.
NORMAN W. FOWLER
BY Richard W. Treverton
ATTORNEY

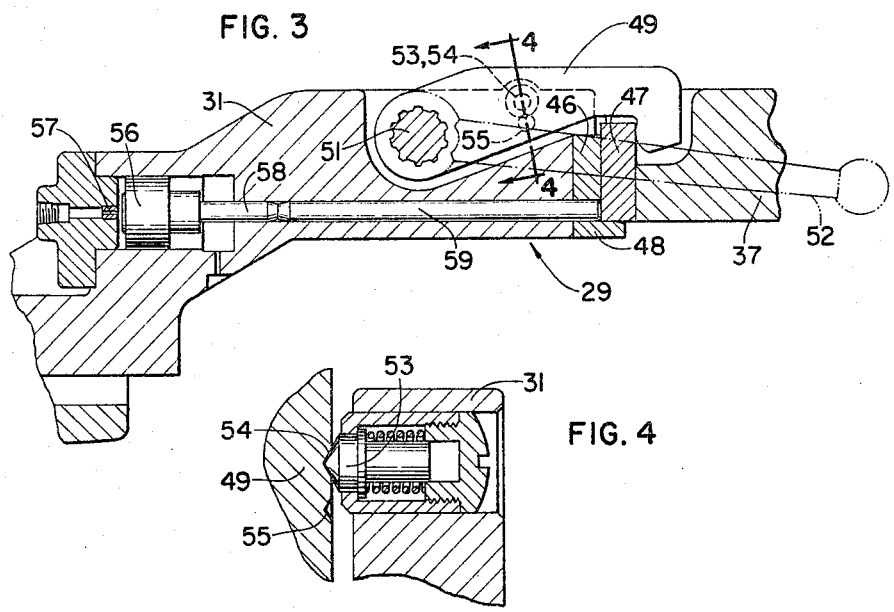

United States Patent Office 3,269,270
Patented August 30, 1966

3,269,270
GEAR MACHINE OR THE LIKE
Norman W. Fowler, Rochester, N.Y., assignor to The Gleason Works, Rochester, N.Y., a corporation of New York
Filed May 4, 1964, Ser. No. 364,483
13 Claims. (Cl. 90—5)

The present invention relates to a machine for cutting gears or the like, especially non-generated spiral bevel and hypoid gears having tooth surfaces which are either helicoids or surfaces of revolution.

The primary object of the invention is to improve and simplify the mechanism of prior machines of this type, and especially to increase its rigidity and thereby enable more rapid production of high quality gears of coarse pitch.

The foregoing and other objects and advantages will appear from the following description of the preferred embodiment of the invention shown in the accompanying drawings, wherein:

FIGS. 1 and 2 are respectively side and plan views of the machine;

FIG. 3 is a sectional view of the overhead brace shown in FIGS. 1 and 2;

FIG. 4 is a detail sectional view in plane 4—4 of FIG. 3;

Referring to FIGS. 1 and 2 the machine comprises a frame 1 supporting a cutter spindle housing 2 and a work head 3. A spindle 4 for cutter C is journaled for rotation and reciprocation around and along horizontal axis 5. The work head journals a work spindle 6 for indexing rotation about axis 7, which is disposed in a vertical plane parallel to axis 5, the work spindle having secured thereon a work holder 8 for a work gear G in which tooth slots are to be cut by cutter C. Housing 2 is mounted on a plate 9 for horizontal adjustment thereon along a guideway 11 parallel to axis 5, such adjustment being made by means of a screw 12. Plate 9 is adjustable horizontally along a guideway 13 on the frame 1, perpendicular to axis 5, by means of an adjusting screw 14. After such adjustment the housing and plate are clamped together and to the frame by the T-bolts shown.

Work head 3 is mounted on a swinging base 15 for adjustment thereon in a vertical plane, and perpendicularly to work spindle axis 7, by means of an adjusting screw 16. The swinging base is pivoted by trunnions 17 for motion about horizontal axis 18 to advance and withdraw the work head relative to the cutter C. Axis 18 is perpendicular to axis 7 and is spaced below the latter in the advanced or cutting position of the work head shown in FIG. 1, so that the withdrawal motion of the work head is in an arcuate path downwardly away from the cutter. The terminal position of withdrawal is determined by abutment of the swinging base with a bolster part 19 of the frame 1. In this terminal position the work spindle axis 7 is vertical, to facilitate loading and unloading of work gears G. The advance and withdrawal are effected by a pair of hydraulic piston-cylinder units. Each unit comprises a cylinder 21 pivoted at 22 to frame 1 and a piston 23 whose rod 24 is pivoted at 25 to the swinging base. Application of pressure to cylinder 21 is controlled by a manually operated reversing and cut-off valve 26 connected to hydraulic pressure and return lines.

Advance of the swinging base 15 is limited by the abutment of separable parts of an overhead brace 29 which extends between the upper portions of housing 2 and swinging base 15, above the work gear. One of these parts of the brace, designated 31, is adjustable horizontally along ways 32 on a plate 33, parallel to cutter axis 5, and is secured to the plate by T-bolts 34. The plate is adjustable horizontally along way 35 on housing 2, perpendicular to axis 5, and is secured to the housing by T-bolts 36. Another part of the brace, 37, is pivoted by a pin 38 to a bracket 39 and is secured to the latter by a screw 41 which extends through an arcuate slot 42 in the part 37. The bracket is slidably adjustable, along ways 43 on swinging base 15 parallel to work spindle axis 7, by means of an adjusting screw 44, and is secured by screws 45.

Referring particularly to FIG. 3, hardened steel abutment blocks 46 and 47 are rigidly secured respectively to brace parts 31 and 37, block 46 having a lip 48 underlying block 47. A hook-shaped clamp 49 is affixed to a shaft 51 rotatable in part 31 and is engageable with the block 47 to secure parts 31 and 37 together. The blocks 46, 47 are trimmed to such thickness that the hook, when applied as shown in FIG. 3, clamps them tightly together. A handle 52 secured to the shaft 51 enables manual rotation to apply or release the hook. A spring-backed plunger 53, FIGS. 3 and 4, slidable in brace part 31, is engageable in detent recesses 54 and 55 in clamp 49 to respectively maintain the latter in its applied position and in an elevated released position in which the clamp is sufficiently clear of block 47 to allow withdrawal of the swinging base 15.

For checking the terminal advance of the swinging base, as the block 47 closely approaches block 46, the hydraulic dash-pot means shown in FIG. 3 are provided. They comprise piston 56 slidable in a cylinder chamber in brace part 31 which has a restricted port 57 so connected with the hydraulic system as to be connected to exhaust when cylinder 21 is advancing the swinging base 15, and to be connected to pressure when the swinging base is being withdrawn. The piston rod, 58, abuts a rod 59 which is slidable in brace part 31 and is adapted for abutment by block 47.

In setting the swinging base 15 to a desired pre-calculated position, clamp 49 is released, screws 34, 41 and 45 are loosened, and by operation of valve lever 26 pressure is applied to cylinders 21 to inch the swinging base into approximately the desired position. To facilitate this operation a gage bar 136 of calculated length is positioned as shown in FIG. 1 on an adjustable-height gage bar holder 137 located on frame 1, and an indicator gage 138 adapted to contact the bar is mounted in a locating bore 139 in the swinging base. The clamp 49 may then be applied, the brace adjusted on plate 33 to cause bracket 39 to seat on the swinging base, the screws 34 and 41 tightened, and the screws 45 adjusted to allow sliding motion only of bracket 39. The position of the swinging base may then be finely adjusted by means of screw 44, and the screws 45 tightend.

A motor 61 is provided to rotate and reciprocate the cutter spindle 4, and also to operate an intermittent indexing mechanism for the work spindle 6, the drive mechanisms for the cutter spindle and index mechanism being the subject of my divisional application, Serial No. 532,043, filed January 28, 1966. For rough cutting, a gear blank is loaded on work holder 8 while the swinging base 15 is withdrawn to the position thereof in which the work spindle axis 7 is upright. By operation of manual valve 26 the swinging base is advanced to cause brace sections 31 and 37 to abut, and clamp 49 is then applied by means of handle 52. The motor 61 is then started (by switch means, not shown) causing the machine to operate through a cycle wherein the drive means feeds the rotating cutter axially into the gear blank to cut one tooth slot and then withdraws the cutter, and the indexing mechanism then advances the work gear by one index pitch to bring the next tooth space into cutting position. This cutting-indexing cycle repeats automatically for each tooth slot of the gear, and, after the indexing operation following the cutting of the last slot, an automatic counter operated switch, not shown, stops the motor. The clamp 49 is then released and by operation of valve 26 the swinging base is withdrawn to bring the work spindle to upright position for removal of the work gear. In gear finishing, the operation is essentially the same except that during the cutting-indexing cycle the cutter spindle 4 may reciprocate several times (ten times in the example given in my aforementioned divisional application) during each turn of the cutter, and the tooth-to-tooth indexing of the work occurs at the end of each revolution of the cutter, while a gap in the cutter is abreast of the work.

Having now described the machine in its preferred form, and its operation, what I claim as my invention is:

1. A gear cutting machine comprising a frame, a housing supporting a cutter spindle for rotation in a substantially horizontal plane, a work head supporting a work spindle for rotation about an axis disposed in a vertical plane parallel to the cutter spindle axis, and a swinging base carrying said work head and pivoted to the frame, to swing the work spindle in said vertical plane for work advance and work withdrawal, about a horizontal axis perpendicular to the work spindle axis, said horizontal axis being disposed below the work spindle axis whereby the work head is swung upwardly and toward the cutter spindle upon advance of the swinging base and is swung downwardly and away from the cutter spindle upon withdrawal of the swinging base, said work head being adjustable on the swinging base in a direction perpendicular to both said horizontal axis and the work spindle axis.

2. A machine according to claim 1 in which there are means supporting the cutter spindle housing on the frame for adjustment thereon in the direction of the cutter spindle axis and also in the direction of said horizontal axis.

3. A machine according to claim 1 in which the cutter spindle housing is adjustable upon the frame in the direction of said horizontal axis.

4. A machine according to claim 1 in which the cutter spindle housing is adjustable upon the frame in the direction of the cutter spindle axis.

5. A machine according to claim 1 having power-operated means for effecting said advance and withdrawal of the swinging base, abutment surfaces on members carried by said cutter spindle housing and swinging base for limiting said advance, at least one of said members being adjustable to thereby adjust the advance position of the swinging base.

6. A machine according to claim 1 having power-operated means for effecting said advance and withdrawal of the swinging base, and abutment surfaces for limiting withdrawal of the swinging base to a position thereof wherein the work spindle axis is vertical.

7. A machine according to claim 1 having fluid pressure means for effecting said advance and withdrawal of the swinging base, abutment surfaces on members carried by the cutter spindle housing and the swinging base for limiting said advance, at least one of said members being adjustable to thereby adjust the advanced position of the swinging base, and abutment surfaces for limiting the withdrawal to a position of the swinging base wherein the work spindle axis is vertical.

8. A gear cutting machine comprising a frame, a housing supporting a cutter spindle for rotation in a substantially horizontal plane, a work head supporting a work spindle for rotation about an axis disposed in a vertical plane parallel to the cutter spindle axis, a swinging base carrying said work head and pivoted to the frame, for work advance and work withdrawal, about a horizontal axis perpendicular to the work spindle axis, said horizontal axis being disposed below the work spindle axis whereby the work head is swung upwardly and toward the cutter spindle upon advance of the swinging base and is swung downwardly and away from the cutter spindle upon withdrawal of the swinging base, a brace connecting the distal end of the swinging base with the cutter spindle housing, said brace comprising a first section adjustable horizontally upon the cutter spindle housing in the direction of the cutter spindle axis, and a second section adjustable on the swinging base substantially in the direction of the work spindle axis, said brace further comprising a releasable clamp for securing said sections rigidly together in a fixed relationship, fluid pressure means for effecting said advance and withdrawal of the swinging base, and abutment surfaces for limiting withdrawal of the swinging base to a position wherein the work spindle axis is vertical, said first and second sections of the brace being adapted to abut to limit advance of the swinging base.

9. A gear cutting machine comprising a frame, a housing supporting a cutter spindle for rotation in a substantially horizontal plane, a work head supporting a work spindle for rotation about an axis disposed in a vertical plane parallel to the cutter spindle axis, a swinging base carring said work head and pivoted to the frame, for work advance and work withdrawal, about a horizontal axis perpendicular to the work spindle axis, said horizontal axis being disposed below the work spindle axis whereby the work head is swung upwardly and toward the cutter spindle upon advance of the swinging base and is swung downwardly and away from the cutter spindle upon withdrawal of the swinging base, a brace connecting the distal end of the swinging base with the cutter spindle housing, said brace comprising a first section adjustable horizontally upon the cutter spindle housing in the direction of the cutter spindle axis, a second section pivotally adjustable, about an axis parallel to the swinging base axis, upon a bracket that is adjustable on the swinging base substantially in the direction of the work spindle axis, and said brace further comprising a releasable clamp for securing said first and second sections rigidly together in a fixed relationship.

10. A gear cutting machine comprising a frame, a housing supporting a cutter spindle for rotation in a substantially horizontal plane, means supporting the housing on the frame for adjustment horizontally thereon in the direction of the cutter spindle axis and also in the direction perpendicular to said axis, a work head supporting a work spindle for rotation about an axis disposed in a vertical plane parallel to the cutter spindle axis, a swinging base carrying said work head and pivoted to the frame, for work advance and work withdrawal, about a horizontal axis perpendicular to the work spindle axis, said horizontal axis being disposed below the work spindle axis whereby the work head is swung upwardly and toward the cutter spindle upon advance of the swinging base and is swung downwardly and away from the cutter spindle upon withdrawal of the swinging base, the work head being adjustable on the swinging base in a direction perpendicular to both said horizontal axis and the work spindle axis, a brace connecting the distal end of the swinging base with the cutter spindle housing, said brace comprising a first section adjustable horizontally upon the cutter spindle housing in the direction of the cutter spindle axis and also perpendicularly thereto, and a second section adjustable on the swinging base substantially in the direction of the work spindle axis, said brace further comprising a releasable clamp for securing said sections rigidly together in a fixed relationship, fluid pressure means for effecting said advance and withdrawal of the swinging base, and dash-pot means carried by one of said sections for checking the approach of said second section to said fixed relationship upon advance of the swinging base.

11. A gear cutting machine comprising a frame, a housing supporting a cutter spindle for rotation in a substantially horizontal plane, a work head supporting a work spindle for rotation about an axis disposed in a vertical plane parallel to the cutter spindle axis, a swinging base carrying said work head and pivoted to the frame, for work advance and work withdrawal, about a horizontal axis perpendicular to the work spindle axis, said horizontal axis being disposed below the work spindle axis whereby the work head is swung upwardly and toward the cutter spindle upon advance of the swinging base and is swung downwardly and away from the cutter spindle upon withdrawal of the swinging base, a brace comprising a first section adjustable horizontally upon the cutter spindle housing in the direction of the cutter spindle axis, a second section adjustable on the swinging base substantially in the direction of the work spindle axis, and said brace further comprising a releasable clamp for securing said sections rigidly together in a fixed relationship.

12. A gear cutting machine comprising a frame, a housing supporting a cutter spindle for rotation in a substantially horizontal plane, a work head supporting a work spindle for rotation about one axis disposed in a vertical plane parallel to the cutter spindle axis, a swinging base carrying said work head and pivoted to the frame, for work advance and work withdrawal, about a horizontal axis perpendicular to the work spindle axis, said horizontal axis being disposed below the work spindle axis whereby the work head is swung upwardly and toward the cutter spindle upon advance of the swinging base and is swung downwardly and away from the cutter spindle upon withdrawal of the swinging base, means supporting the cutter spindle housing on the frame for adjustment thereon in the direction of the cutter spindle axis and also in the direction of said horizontal axis, and a brace connecting the distal end of the swinging base with the cutter spindle housing, said brace comprising a first section adjustable horizontally upon the cutter spindle housing in the direction of the cutter spindle axis and also perpendicularly thereto, and, a second section adjustable on the swinging base substantially in the direction of the work spindle axis, and said brace further comprising a releasable clamp for securing said sections rigidly together in a fixed relationship.

13. A machine according to claim 12 having means for effecting said advance and withdrawal of the swinging base, and dash-pot means carried by one of said sections for checking the approach of said second section to said fixed relationship upon advance of the swinging base.

References Cited by the Examiner
UNITED STATES PATENTS

| | | | |
|---|---|---|---|
| 2,196,087 | 4/1940 | Staples et al. | 90—5 |
| 2,261,052 | 10/1941 | Coffin et al. | 90—56 |
| 2,329,135 | 9/1943 | Peterson et al. | 90—58 |
| 2,356,097 | 8/1944 | Stanley | 90—56 |
| 2,595,424 | 5/1952 | Studler | 90—58 |
| 2,652,243 | 9/1953 | Reed | 90—58 XR |
| 2,710,563 | 6/1955 | Messmer | 90—14 |
| 2,929,300 | 3/1960 | Zwick | 90—14 |
| 3,020,808 | 2/1962 | Apitz | 90—5 |

FOREIGN PATENTS 37,526  12/1930  France.

References Cited by the Applicant
UNITED STATES PATENTS

| | | |
|---|---|---|
| 678,385 | 7/1901 | Ferris. |
| 1,730,637 | 10/1929 | White. |
| 2,044,485 | 6/1936 | Schauseil et al. |
| 2,188,996 | 2/1940 | Carlsen. |
| 2,898,780 | 8/1959 | Carlsen et al. |
| 3,110,225 | 11/1963 | Carlsen et al. |
| 3,139,194 | 6/1964 | Howing. |

WILLIAM W. DYER, JR., *Primary Examiner.*

G. A. DOST. *Assistant Examiner.*